(12) United States Patent
Zhao et al.

(10) Patent No.: US 9,378,757 B2
(45) Date of Patent: Jun. 28, 2016

(54) METHODS OF MAKING A NEAR FIELD TRANSDUCER WITH A FLARE PEG

(71) Applicant: Seagate Technology LLC, Cupertino, CA (US)

(72) Inventors: Yongjun Zhao, Eden Prairie, MN (US); Dongsung Hong, Edina, MN (US); Lijuan Zou, Eden Prairie, MN (US); Mark Ostrowski, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 108 days.

(21) Appl. No.: 13/789,252

(22) Filed: Mar. 7, 2013

(65) Prior Publication Data

US 2014/0251948 A1    Sep. 11, 2014

(51) Int. Cl.
*G11B 5/10*      (2006.01)
*G11B 5/31*      (2006.01)
*G11B 5/60*      (2006.01)
*G11B 5/00*      (2006.01)

(52) U.S. Cl.
CPC .............. *G11B 5/314* (2013.01); *G11B 5/3163* (2013.01); *G11B 5/6088* (2013.01); *G11B 2005/0021* (2013.01)

(58) Field of Classification Search
CPC ........... G11B 2005/0021; G11B 5/315; G11B 5/6088
See application file for complete search history.

(56) References Cited

U.S. PATENT DOCUMENTS

| 4,240,869 | A | * | 12/1980 | Diepers ............................ 216/20 |
| 6,080,272 | A | * | 6/2000 | Langley et al. .......... 156/345.53 |
| 6,531,069 | B1 | * | 3/2003 | Srivastava et al. .............. 216/67 |
| 8,159,769 | B2 | | 4/2012 | Batra et al. |
| 8,248,891 | B2 | | 8/2012 | Lee et al. |
| 8,279,719 | B1 | | 10/2012 | Hu et al. |
| 8,286,329 | B1 | | 10/2012 | Zhao et al. |
| 8,351,151 | B2 | | 1/2013 | Katine et al. |
| 2006/0024945 | A1 | * | 2/2006 | Kim et al. ...................... 438/618 |
| 2009/0325082 | A1 | * | 12/2009 | Ryu .................................. 430/5 |
| 2010/0074063 | A1 | | 3/2010 | Peng et al. |
| 2010/0271910 | A1 | | 10/2010 | Boutaghou |
| 2011/0170381 | A1 | * | 7/2011 | Matsumoto ................ 369/13.33 |
| 2011/0228418 | A1 | * | 9/2011 | Sasaki et al. ................... 360/59 |
| 2012/0039155 | A1 | | 2/2012 | Peng et al. |
| 2012/0163139 | A1 | | 6/2012 | Vavra et al. |
| 2012/0314549 | A1 | | 12/2012 | Lee et al. |
| 2014/0233361 | A1 | | 8/2014 | Shimazawa |

OTHER PUBLICATIONS

File History for U.S. Appl. No. 13/789,272 as retrieved from the U.S. Patent and Trademark Office on Apr. 24, 2014, 97 pages.
Challener et al. "Heat-Assisted Magnetic Recording by a Near-Field Transducer with Efficient Optical Energy Transfer." Nature Photonics. vol. 3. Apr. 2009. pp. 220-224.
File History for U.S. Appl. No. 13/789,272 as retrieved from the U.S. Patent and Trademark Office on Sep. 19, 2014, 136 pages.

* cited by examiner

*Primary Examiner* — Duy Deo
*Assistant Examiner* — Erin Bergner
(74) *Attorney, Agent, or Firm* — Hollingsworth Davis, LLC (57) ABSTRACT

The disclosed methods enable the production of plasmonic near-field transducers that are useful in heat-assisted magnetic recording. The plasmonic near-field transducers have an enlarged region and a peg region. The peg region includes a peg region in proximity to an air-bearing surface above a recording medium and also includes a flared region between and in contact with the enlarged region and the peg region. The flared region can act as a heat sink and can lower the thermal resistance of the peg portion of the near-field transducer, thus reducing its temperature.

20 Claims, 9 Drawing Sheets

METHODS OF MAKING A NEAR FIELD TRANSDUCER WITH A FLARE PEG

SUMMARY

Various embodiments disclosed herein are generally directed to methods, systems, and apparatuses that facilitate coupling a laser diode to a magnetic writer that includes a magnetic write head. The methods, systems and apparatuses include a plasmonic near-field transducer for heat-assisted magnetic recording (HAMR). Typical near-field transducers can generate a large amount of heat in their writing tip. Disclosed are solutions to this heat buildup.

In one aspect, a method of making a plasmonic near-field transducer is disclosed that includes providing a substrate at least partially covered with a thin layer of a plasmonic material, overlaying at least one mask on the plasmonic material and etching the plasmonic material through the mask to form a flared region that narrows towards an output end of the plasmonic near-field transducer. The plasmonic near-field transducer, optionally, includes a peg region that extends from the flared region to the output end. The method further includes patterning an enlarged region of plasmonic material atop and in contact with the flared region.

In another aspect, a method making a plasmonic near-field transducer is disclosed that includes providing a planar substrate covered with a thin layer of at least one plasmonic material, overlaying the plasmonic material with a hard mask having an enlarged region and a peg region, and milling the plasmonic material at an angle to the substrate surface while rotating the substrate around an axis normal to the plane of the substrate surface.

In this disclosure:

"binary mask" refers to a photomask used to form a pattern on a semiconductor substrate by directly blocking or absorbing radiation such as actinic radiation, or x-ray radiation;

"break point" refers to the point on the enlarged portion of a disclosed near-field transducer that is in contact with the flared region of the disclosed near-field transducer and is closest to the output end of the disclosed near-field transducer;

"phase-shift mask" refers to a photo mask in which certain transmitting regions are made thinner or thicker to cause a phase shift in light traveling through those regions of the photomask, thus increasing their resolution; and "hard mask" refers to a mask that can resist ion etching of a substrate upon which it has been placed.

The disclosed methods enable the production of plasmonic near-field transducers that are useful in heat-assisted magnetic recording. The plasmonic near-field transducers have an enlarged region and a flared region. The flared region can, optionally, include a peg region that has an output end in proximity to an air-bearing surface above a recording medium. The flared region and, if present, the peg region can act as a heat sink and can lower the thermal resistance of the flared portion of the near-field transducer, thus reducing its temperature.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be directed to an optical focusing element, such as a planar solid immersion mirror (PSIM). The PSIM may concentrate the energy into a NFT. The NFT causes the energy to be delivered to the media in a very small spot.

A waveguide, NFT, and PSIM are examples of integrated optical devices that are formed within the slider. The field of integrated optics generally relates to the construction of optics devices on substrates, sometimes in combination with electronic components, to produce functional systems or subsystems. For example, light may be transferred between components via waveguides that are built up on a substrate using layer deposition techniques. These waveguides may be formed as a layer of materials, with a middle core layer having a relatively high refractive index, and top/bottom cladding layers of relatively low refractive index. Other optical components may be formed in similar fashion, including the NFT and PSIM discussed above.

In a HAMR slider, light is launched into these integrated optics components from a light source such as a laser diode. One way to launch light into a slider is from an externally mounted laser via an optical waveguide or grating coupler fabricated in a slider. Another way is to place a laser light source, such as a laser diode, into the slider, called laser-in-slider (LiS) light delivery. In laser-in-slider configurations, light is launched from the emitting facet of a laser diode into an optical waveguide. Laser-in-slider light delivery can be integrated at a wafer level and may be suitable for mass production.

Figure 1:
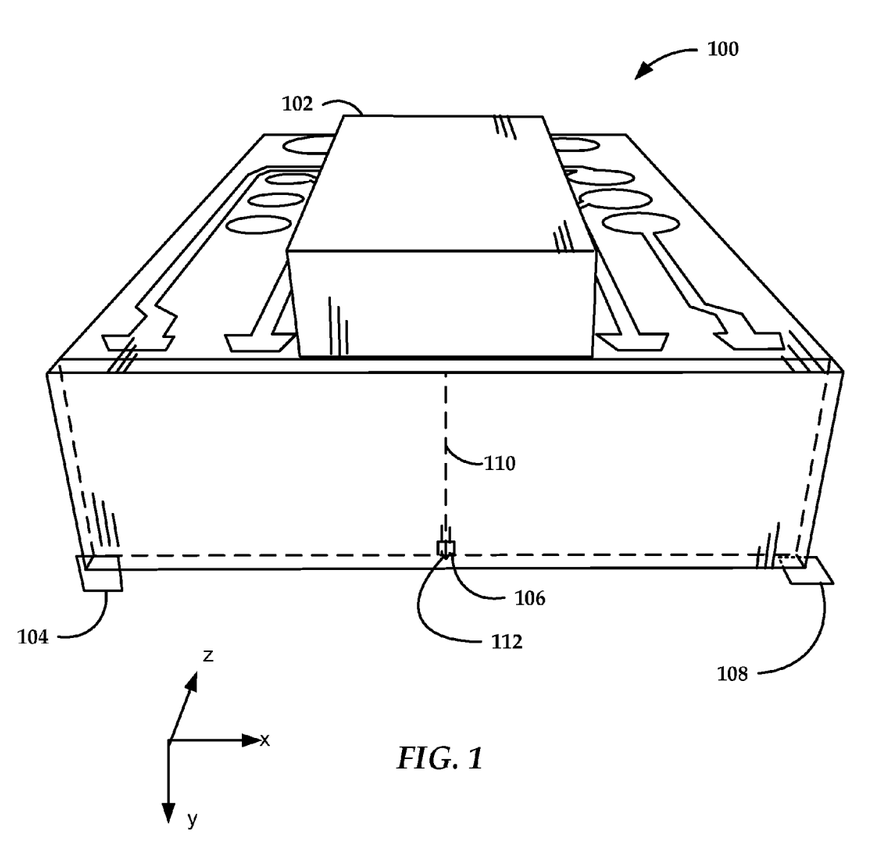
FIG. 1 is a perspective view of a hard drive slider that includes a disclosed near-field transducer.

FIG. 1 is a perspective view of a hard drive slider that includes a disclosed near-field transducer. HAMR slider 100 includes laser diode 102 located on top of HAMR slider 100 proximate to trailing edge surface 104 of HAMR slider 100. Laser diode 102 delivers light proximate to read/write head 106, which has one edge on air bearing surface 108 of HAMR slider 100. Air bearing surface 108 faces and is held proximate to a moving media surface (not shown) during device operation.

Laser diode 102 provides electromagnetic energy to heat the media at a point near to read/write head 106. Optical coupling components, such as a waveguide 110, are formed integrally within HAMR slider 100 to deliver light from laser diode 102 to the media. In particular, local waveguide 110 and NFT 112 may be located proximate read/write head 106 to provide local heating of the media during write operations. Laser diode 102 in this example may be an integral, edge emitting device, although it will be appreciated that waveguide 110 and NFT 112 may be used with any light source and light delivery mechanisms. For example, a surface-emitting laser (SEL) may be used instead of an edge firing laser.

While the example in FIG. 1 shows laser diode 102 integrated with HAMR slider 100, NFT 112 discussed herein may be useful in any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to slider-integrated waveguide 110 which energizes NFT 112.

A HAMR device utilizes the types of optical devices described above to heat a magnetic recording media (e.g., hard disk) in order to overcome superparamagnetic effects that limit the areal data density of typical magnetic media. When writing to a HAMR medium, the light can be concentrated into a small hotspot over the track where writing takes place. The light propagates through waveguide 110 where it is coupled to NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, NFT 112 is employed to create a hotspot on the media.

NFT 112 is a near-field optics device designed to reach local surface plasmon resonance at a designed wavelength. A waveguide and/or other optical element concentrates light on a transducer region (e.g., focal region) where NFT 112 is located. NFT 112 is designed to achieve surface plasmon resonance in response to this concentration of light. At resonance, a high electric field surrounds NFT 112 due to the collective oscillations of electrons at the metal surface. Part of this field will tunnel into a storage medium and get absorbed, thereby raising the temperature of a spot on the media as it being recorded. NFTs generally have a surface that is made of a material that supports surface plasmons such as aluminum, gold, silver, or copper. They may also have other materials but they must have a material that supports surface plasmons on their outer surface.

Figure 2:
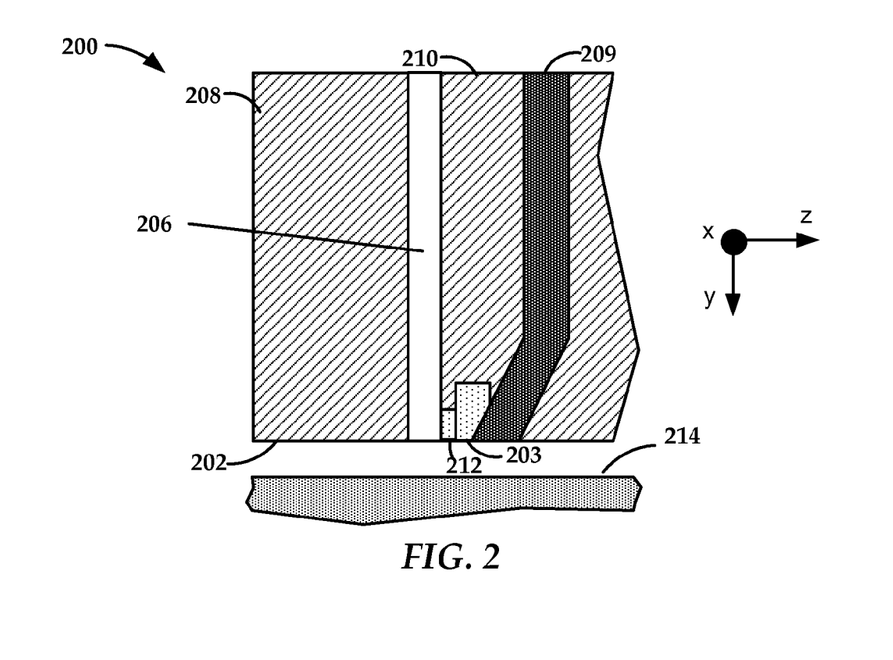
FIG. 2 is a cross-sectional view of a disclosed near field transducer positioned in a magnetic write head.

FIG. 2 is a cross-sectional view of a disclosed near field transducer positioned in a magnetic write head. NFT 212 is located proximate media-facing surface 202 (e.g., air-bearing surface (ABS)), which is held near media surface 214 during device operation. Media-facing surface 202 is arranged parallel to the x-z plane. Waveguide core 206 may be disposed proximate to NFT 212, which is located at or near media writing surface 214 of media 204 and adjacent to read/write head 203. Waveguide core 206 is surrounded by cladding layers 208 and 210 that have different indices of refraction than waveguide core 206. Light is delivered from waveguide core 206 along the y-direction where it is coupled to NFT 212. NFT 212 delivers surface plasmon-enhanced, near-field electromagnetic energy along the y-axis where it exits at media writing surface 214. This may result in a highly localized hot spot (not shown) on media surface 214 when magnetic recording media 204 placed in close proximity to media-facing surface 202 of HAMR apparatus 200. Further illustrated in FIG. 2 is recording pole 209 of the read/write head that is located alongside the NFT 212. Recording pole 209 generates a magnetic field (e.g., perpendicular field) used in changing the magnetic orientation of the hotspot during writing.

Typical NFTs that have been used in HAMR applications have an enlarged region that acts as a collector of light emitted from a light source, such as a laser diode, and a peg region that allows the energy from the laser light to be "focused" to a very small spot on the recording media. This spot is much smaller than the diffraction limit due to surface plasmons generated by the near-field transducer.

Figure 3:
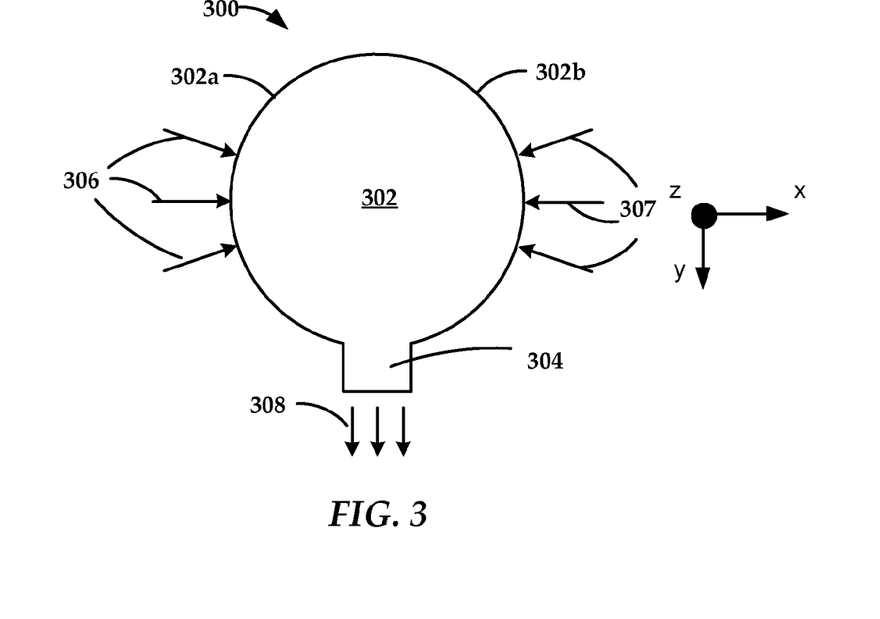
FIG. 3 is a plan view of a typical near-field transducer.

In the following drawings for near-field transducers, the size of the enlarged region is much larger than that of the flared region or peg region. The figures are modified in relative size to fit on the paper. FIG. 3 is a plan view of a typical near-field transducer used in HAMR magnetic recording systems and apparatuses. NFT 300 includes enlarged circular disc region 302 and peg region 304 that is disposed proximate the media-facing surface (e.g., surface 202 in FIG. 2). NFT 300 is formed from a thin film of plasmonic material (e.g., gold, silver, copper, aluminum, or alloys thereof) on a substrate parallel plane of the slider proximate the write pole (e.g., write pole 212 in FIG. 2). The plasmonic material is typically deposited by vacuum evaporation or sputtering on a dielectric substrate. Typically, the substrate can include silicon, aluminum titanium carbide, or any other substance having low conductivity. The light delivery waveguide (e.g., waveguide core 206 in FIG. 2) is shaped to direct light to a focal point and delivers light 306 and 307 to first and second sides 302a and 302b of NFT 300 which is positioned adjacent to the focal point. Light 306 and 307 causes plasmon resonance on the surface of NFT 300, and plasmons 308 generated by this resonance are emitted from peg 304 towards the data storage media where they are absorbed to create a hotspot.

Temperature increase inside the peg region of NFTs is a challenge in HAMR write heads. It would be desirable to design an NFT that has less of a temperature increase than NFTs known in the art. To reduce the temperature of the peg region of an NFT the thermal resistance of the peg should be reduced. However, the thermal resistance of the peg must also be reduced without substantially compromising the transducer performance (i.e. coupling efficiency). The coupling efficiency is the percentage of energy output from the NFT into the media surface, divided by the energy input at the incident plane of the NFT from the energy source.

Also, related to the temperature increase is the thermal resistance. Thermal resistance of an object is directly proportional to the length of the object and inversely proportional to the cross-sectional area and thermal conductivity of the object (Fourier's Law). A typical material for an NFT is gold which has good mechanical and optical/plasmonic properties compared to other materials. Varying the NFT material may not substantially increase the thermal conductivity. Therefore, other means are required for reducing the thermal resistance of the peg region. In one aspect, to minimize thermal resistance the length of the peg region may be decreased. In another aspect, to minimize thermal resistance the cross-sectional area of the peg may also be increased. However, the cross-sectional area of the peg at the air-bearing surface, nearest the recording media, is dictated by the parameters required for magnetic recording. Additionally, specific wavelength of light from the laser diode dictates the size of the enlarged region (disc) of the NFT and the peg length in order to get optimal (maximum) coupling efficiency of the laser light to the NFT. As a result, the disclosed approach to an NFT with lower thermal resistance is to use an NFT with a flared region as shown in FIGS. 4A and 4B.

Figure 4A:
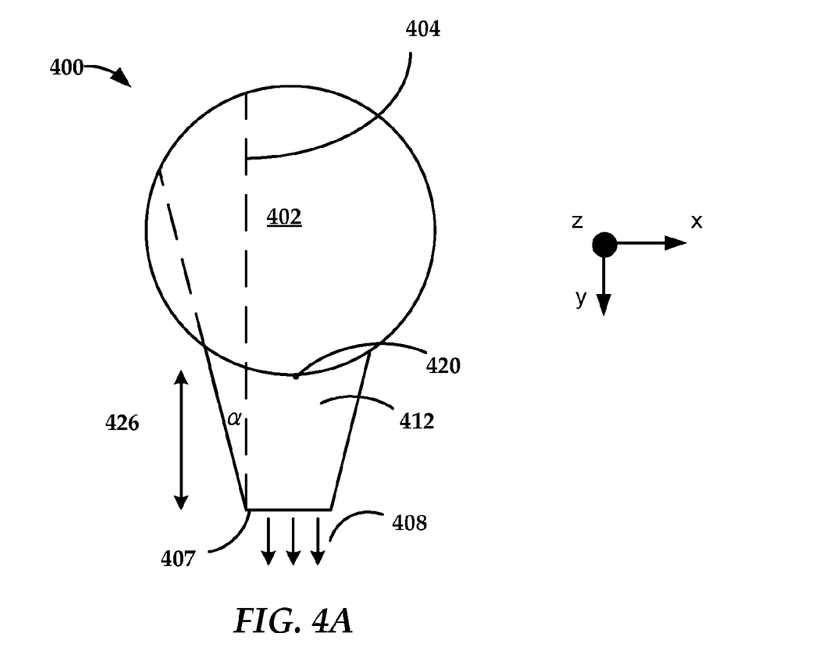
FIG. 4A is a plan view of an embodiment of a disclosed near-field transducer that has a flared region.
Figure 4B:
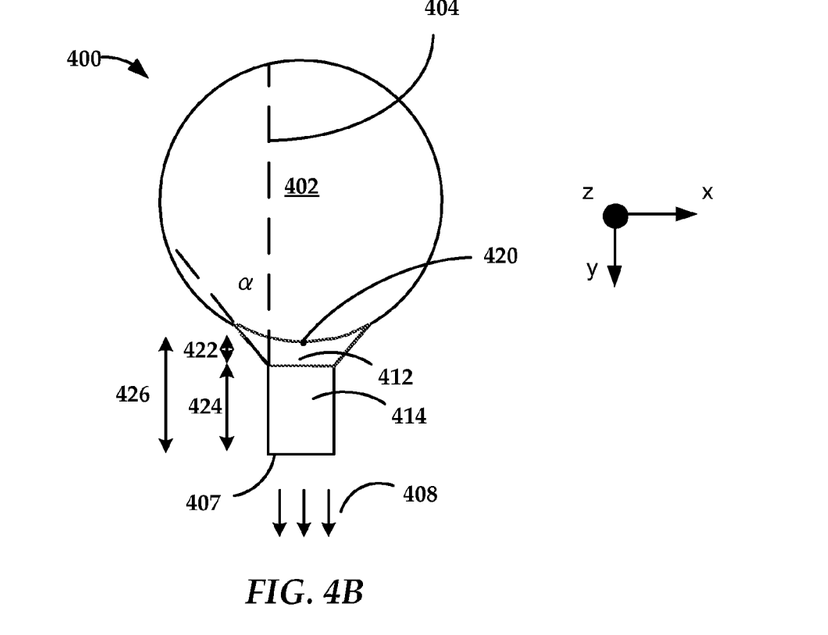
FIG. 4B is a plan view of an embodiment of a disclosed near-field transducer that has a peg region extending from a flared region.

FIG. 4A is a plan view of an embodiment of a disclosed near-field transducer used in a HAMR magnetic recording apparatus or system. NFT 400 includes enlarged region 402 at an input end, in contact with flared region 412 at break point 420. Flared region 412 narrows to output end 407 disposed adjacent to the media-facing surface (e.g., surface 214 in FIG. 2). NFT 400 is formed from a thin film of plasmonic material (e.g., gold, silver, copper, aluminum, or an alloy thereof) on a substrate parallel plane of the slider proximate the write pole (e.g., write pole 209 in FIG. 2).

Flared region 412, has flare angle, ($\alpha$), wherein ($\alpha$) is the angle between a reference position normal to output end 407 (or the air-bearing surface) and an outside edge of flare region 412. In FIG. 4A the flare angle, ($\alpha$), of peg region 404 is shown by the dotted lines indicating the angle. Further, peg region 404 directs energy produced by plasmons at output end 407 that emanates towards the air-bearing surface of magnetic recording medium (not shown) in direction of plasmon arrows 408. Enlarged region 402 may comprise a variety of geometries and is not limited to a circular disc, as shown in FIG. 4A. For example, enlarged region 402 may have a circular, elliptical, rectangular, or triangular cross-section. Furthermore, each cross-section may include extended regions to create an even larger cross-sectional area. Flared region 412 defines a volume of plasmonic material that is larger than that of a typical NFT without a flared region (e.g., NFT 300 from FIG. 3). This larger volume of flared region 412 provides lower thermal resistance than in a typical NFT by providing a larger cross-sectional area that can act as a heat sink and direct more heat away from flared region 404.

In some embodiments, the flared region of the disclosed near-field transducers can include a peg region that extends from the break point to the output end and has a length (e.g., 426 from FIG. 4A) from about 10 nm to about 30 nm, from about 15 nm to about 25 nm, or about 20 nm. In some embodiments, the flare angle, a, can make an angle of from about 15 degrees to about 30 degrees from the normalized reference position. The normalized reference position is shown in FIGS. 4A and 4B as dashed line 404. The normalized reference position is normal to the air bearing surface of the near-field transducer which is parallel to the output end of the transducer as shown in FIGS. 4A and 4B as dashed line 404. The flared region and the peg region, independently, may have a thickness of from about 20 nm to about 60 nm, from about 30 nm to about 45 nm, or even from about 35 nm (measured in the "z" direction). Further description of disclosed NFTs with flared pegs and methods of making them are disclosed, for example, in Applicant's co-pending case U.S. Pat. No. 9,304,253.

The disclosed near-field transducers can include a substrate which has been at least partially covered with a thin layer of plasmonic material. The substrate can comprise any material capable of supporting a thin layer of plasmonic material. Typical substrates include silicon wafers, inorganic and organic dielectrics, polymer dielectrics, glass, non-conductive metals and ceramics. Typical plasmonic materials include at least one of aluminum, silver, copper, gold, and alloys thereof. Gold is a typically used material due to its good mechanical properties, coupling efficiency and its ability to generate surface plasmons.

FIG. 4B is a plan view of another disclosed near-field transducer used in a HAMR magnetic recording apparatus or system. NFT 400 includes enlarged region 402 and flared region 412 that includes flared region 412 and peg region 414. Peg region 414 includes output end 407 disposed proximate the media-facing surface (e.g., surface 214 in FIG. 2). NFT 400 is formed from a thin film of plasmonic material (e.g., gold, silver, copper, aluminum, or an alloy thereof) on a substrate parallel plane of the slider proximate the write pole (e.g., write pole 209 in FIG. 2). Flared region 412 has flare angle, ($\alpha$), wherein ($\alpha$) is the angle between a reference position normal to the output end of flared region 412 and an outside edge of flare region 412. In FIG. 4B the flare angle, α, of flare region 412 is shown by the dotted lines indicating the angle.

Peg region 414 directs plasmons produced by NFT 400 at output end 407 towards the air-bearing surface of magnetic recording medium (in direction of plasmon arrows 408, but not shown). Enlarged region 402 may comprise a variety of geometries and is not limited to a circular disc, as shown in FIG. 4B. For example, enlarged region 402 may have a circular, elliptical, rectangular, or triangular cross-section. Furthermore, each cross-section may include extended regions to create an even larger cross-sectional area.

The NFTs with flared regions as shown in FIGS. 4A and 4B define a volume of plasmonic material that is larger than that of an NFT without a flared region. This larger volume provides lower thermal resistance between the enlarged region and the flared region than in a typical NFT without a flared region. By providing an NFT with larger cross-sectional area the thermal resistance of the NFT can be reduced and the larger area can act as a heat sink and direct more heat away from the output end.

In some embodiments, the disclosed near-field transducers can include a peg region that has a length (e.g., 426 from FIG. 4B) that is from about 10 nm to about 30 nm, from about 15 nm to about 25 nm, or about 20 nm in length. In some embodiments, the flare region may have a length (e.g., 422 from FIG. 4B) that can extend from about 10 nm to about 30 nm from the break point of the near-field transducer. In some embodiments, the peg region may have a length (e.g., 424 from FIG. 4B) that can extend from the output end of the flared region from about 10 nm to about 30 nm to the output of the peg region (e.g., 407). In some embodiments, the flare angle, α, can make an angle of from about 15 degrees to about 30 degrees from the normalized reference position. The peg can have a width (measured across the face of the peg) of from about 20 nm to about 60 nm, from about 30 nm to about 45 nm, or even from about 35 nm. The peg region may also have a thickness of from about 20 nm to about 60 nm.

The present disclosure relates to methods for making plasmonic near-field transducers that include a flared region. In one aspect, a disclosed method includes providing a substrate covered with a thin layer of plasmonic material. The substrate can be any material capable of supporting a thin layer of plasmonic material. Typical substrates include dielectrics such as silicon, inorganic and organic dielectrics, and polymer dielectrics, glasses, nonconductive metals and ceramics. The substrate is covered with a thin layer of a plasmonic material. Typical plasmonic materials include aluminum, silver, copper, gold, and alloys thereof. Gold is a preferred material due to its ability to generate surface plasmons and its good coupling efficiency.

Figure 5A:
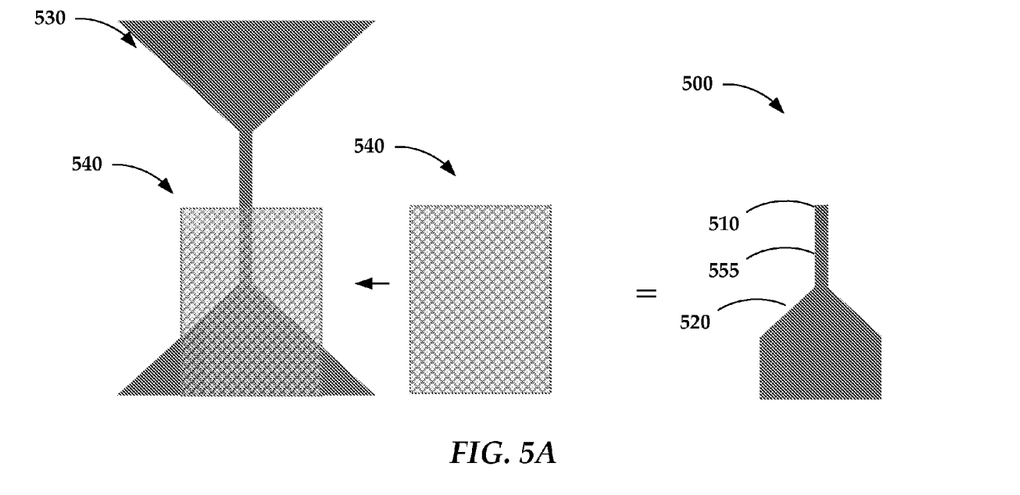
FIG. 5A is a scheme for the use of masks to form a typical peg region of a near-field transducer.
Figure 5B:
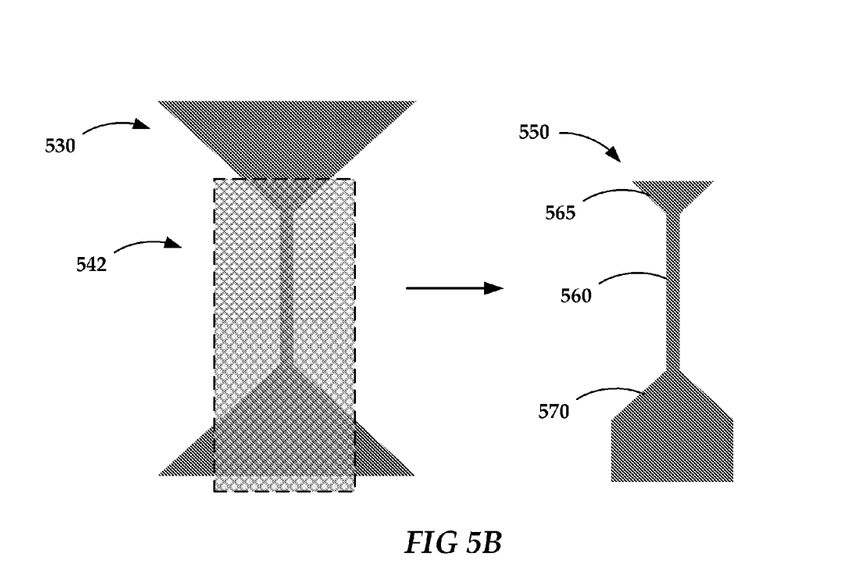
FIG. 5B is a scheme for the use of masks to form an embodiment of a disclosed near-field transducer that includes a flared region and a peg region.

To make a disclosed near-field transducer that includes a flared region, the substrate which has been at least partially covered with a thin layer of plasmonic material is overlaid with at least one mask. In some embodiments, the mask is a binary mask. In other embodiments, the mask is a phase-shift mask. In yet other embodiments, the at least one mask includes a binary mask and a phase-shift mask. FIG. 5A is a scheme for using masks to form a typical peg region of a plasmonic near-field transducer. A substrate covered with a plasmonic material (not shown) is overlaid with phase-shift mask 530 in the form of a double hourglass. Plasmonic material is etched away from the substrate in areas not covered by the phase-shift mask. A phase-shift mask allows for high resolution on the very small features of the stem. Binary mask 540 is then placed over the double hourglass shape. Etching (e.g., ion etching) of the plasmonic material in areas not covered by the masks yield structure 500 that has peg 555 with peg end 510 attached to base 520. Structure 500 can have an enlarged disc region patterned onto peg end 510 by, for example, evaporation or sputtering, to produce a "lollipop" near-field transducer. FIG. 5B is a scheme for the use of masks to form an embodiment of a disclosed flared region with peg region. In a process analogous to that illustrated in FIG. 5A, a substrate covered with a plasmonic material (not shown) is overlaid with phase shift mask 530 in the form of a double hourglass. Ion etching a first time yields the same double hourglass shape of plasmonic material as in the process illustrated in FIG. 5A. Binary mask 542 is then placed over phase shift mask 530 as shown in FIG. 5B. After etching of the plasmonic material, structure 550 is formed. Structure 550 includes base 570, peg region 560, and flared region 565. Structure 550 can have an enlarged disc region patterned onto flared region 565 to produce a near-field transducer having a peg that includes a flare peg.

Figure 6A:
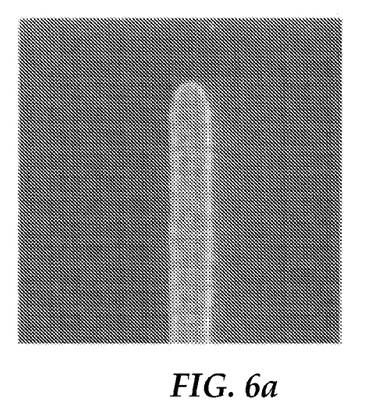
FIG. 6A is a photomicrograph of a peg region of a typical near-field transducer.
Figure 6B:
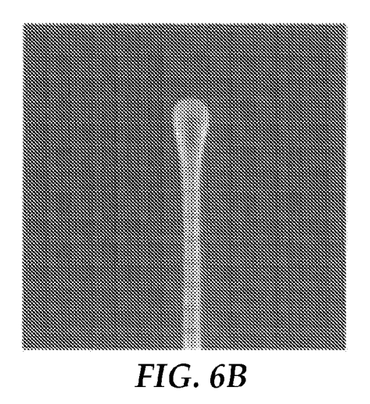
FIGS. 6B and 6C are photomicrographs of flared regions and peg regions of disclosed near-field transducers.
Figure 6C:
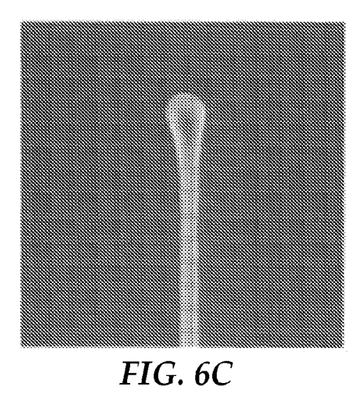
Figure 7A:
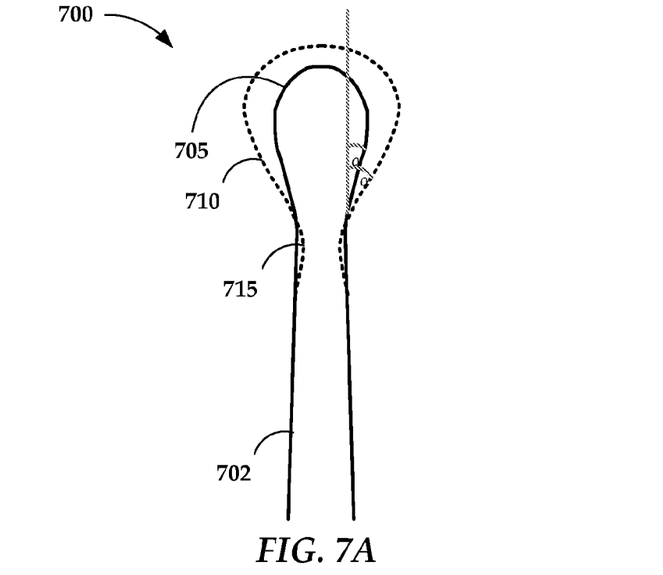
FIGS. 7A and 7B are schematic diagrams illustrating simulations of flared regions and peg regions useful in embodiments of disclosed near-field transducers.
Figure 7B:
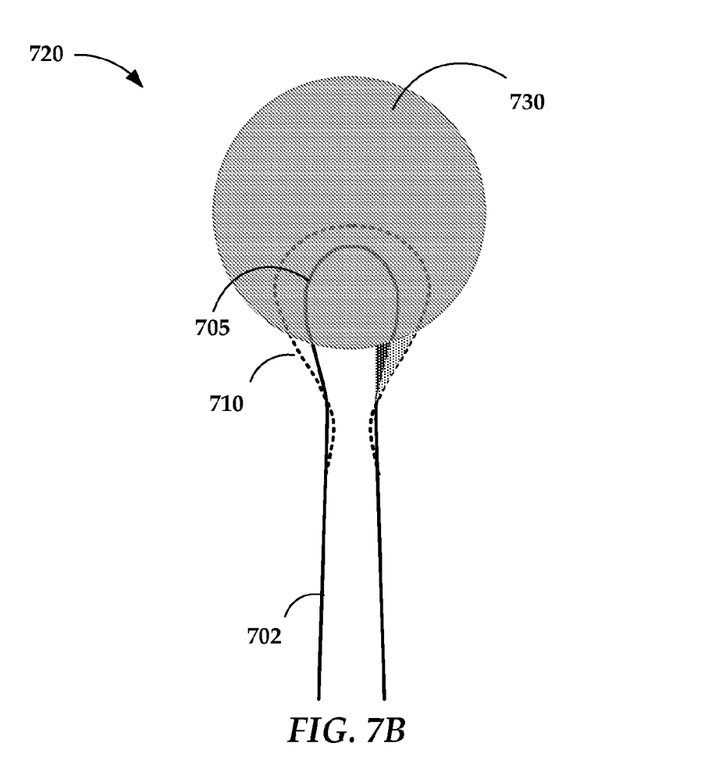
Figure 8A:
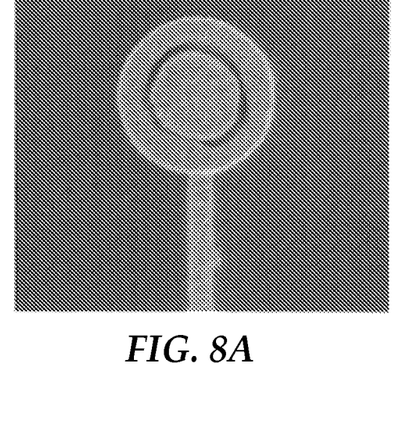
FIGS. 8A and 8B are photomicrographs of near-field transducers made from the peg regions and flared regions of disclosed near-field transducers illustrated in FIGS. 6A and 6B.
Figure 8B:
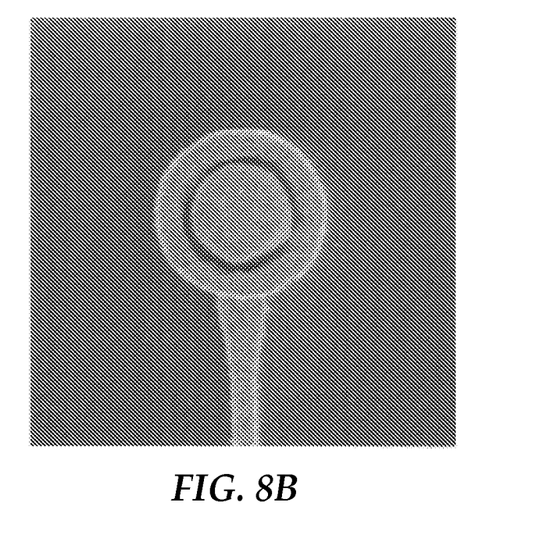

FIG. 6A is a photomicrograph of a peg region of a typical near-field transducer made using the above-described method as illustrated in FIG. 5A. The peg has a narrow diameter and has a straight end. FIGS. 6B and 6C are photomicrographs of peg regions of disclosed near-field transducers that have a peg region and a flared region made using the above-described method as illustrated in FIG. 5B. The amount of flare (flared angle) and the shape of the flare can be determined by the placement of the masks as shown in FIG. 5B and by changing the exposure parameters and by the phase shift mask design FIGS. 7A and 7B are schematic diagrams illustrating simulations of flared pegs useful in embodiments of disclosed near-field transducers. In FIG. 7A, peg stem 702 can support different flared regions. The flared regions can make a small angle, "α", with flare end 705 as shown in FIG. 7A. A larger angle, "α", can be formed by making the upper portion of the phase-shift mask (shown in FIG. 5A) wider and an even larger angle can be formed by making a small indentation 715 in the peg stem so as to increase the angle. The complete disclosed near-field transducer can be completed by sputtering or evaporating a plasmonic enlarged region 730 onto the peg regions with two different angles shown in FIG. 7A and by the differently shaded angles in FIG. 7B. FIGS. 8A and 8B are photomicrographs of near-field transducers made from the peg regions of disclosed near-field transducers illustrated in FIGS. 6A and 6B using the above-described method.

In another aspect, a one-step method of making near-field transducers having an enlarged portion of plasmonic material atop and in contact with a peg region of a plasmonic near-field transducer is disclosed. The disclosed method includes providing a planar substrate covered with a thin layer of at least one plasmonic material. The planar substrate and the plasmonic materials are described above and are the same as for the first method presented herein. The disclosed method also includes overlaying the at least one plasmonic material with a hard mask having an enlarged region and a peg region. The disclosed method includes milling the plasmonic material at an angle to the substrate surface while rotating the substrate. The milling can include ion etching.

Figures 9A, 9B:
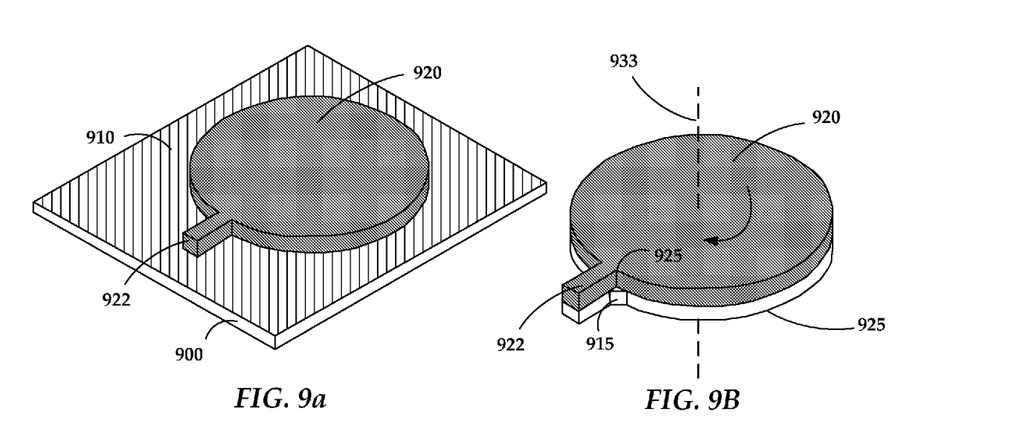
FIGS. 9A-9C are perspective views and FIG. 9D is a plan view of a process of making disclosed near-field transducers.
Figures 9C, 9D:
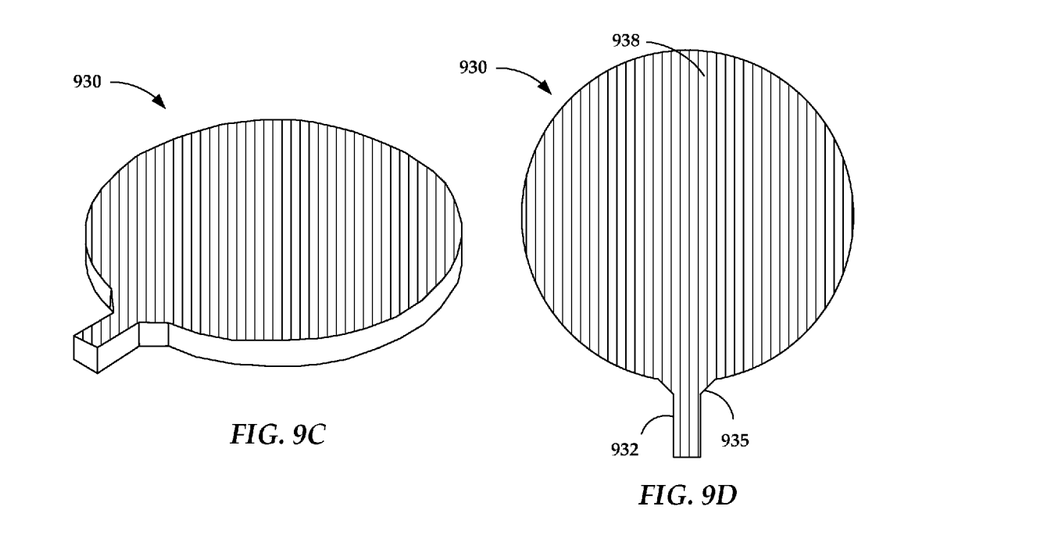

FIGS. 9A-9C are perspective views and FIG. 9D is a plan view of a process of making disclosed near-field transducers. FIG. 9A is an illustration of hard mask 920 having peg region 922 disposed upon substrate 900 that is covered with plasmonic material 910. Hard mask 920 is a mask capable of resisting milling (by, for example, ion beam etching) and is typically made of amorphous carbon, titanium nitride, silicon, metal oxide nanocrystals, or ceramics. The masked substrate 900 is subjected to ion etching (FIG. 9B) at an angle other than normal to the plane of substrate 900 while rotating the substrate in the direction indicated around axis 933. Since the substrate is rotated during the ion etching at the corner 915 where peg 922 is connected to enlarged portion 925, the enlarged portion shadows the etching forming rounded edge 915 on the etched substrate. The ion etching will remove the layer of plasmonic material 910 from substrate 900 but may not remove substrate 900. FIGS. 9B-9D do not show the substrate if it still remains after ion beam etching other than where it has been protected by the hard mask. FIG. 9C is a perspective view of the substrate showing etched near-field transducer with a flared peg 930 with hard mask 920 removed. FIG. 9D is a plan view of the same near-field transducer 930 showing enlarged region 938, and peg 932 that has a peg region (away from enlarged region) and flared region 935.

In the example presented schematically in FIGS. 9A-9D, gold is used as the plasmonic material and is deposited on a silicon wafer substrate. The hard mask is made of amorphous carbon and varies from about 20 nm to about 60 nm. Thicker hard masks produce more shadowing during ion etching resulting in a higher flare angle and more flare in the flared region. The gold is milled by ion etching. The angle between the ion beam can be adjusted from 0 to about 75 degrees from vertical (axis 933). Higher beam angle also produces a higher flare angle and more flare in the flared region. Thus, the flare angle and shape of the flared region can be tuned by design requirements.

Figure 10A:
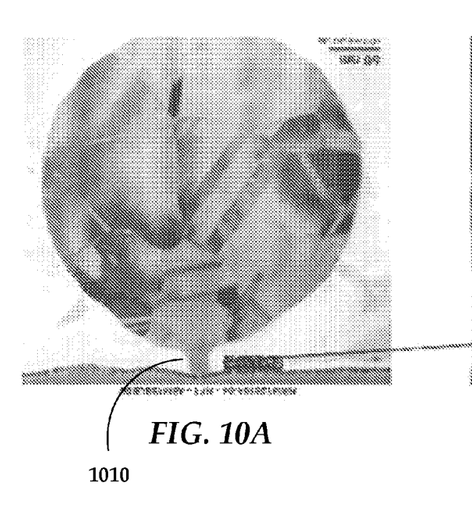
FIGS. 10A and 10B are photomicrographs of a disclosed near-field transducer made using the process diagrammed in FIGS. 9A-9D.
Figure 10B:
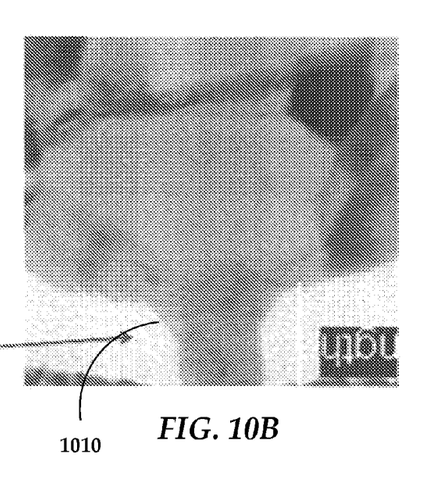

FIGS. 10A-B are photomicrographs of a disclosed near-field transducer made using the process illustrated in FIGS. 9A-9D showing flared region 1010. FIG. 10B is a magnified photomicrograph of the flared region shown in FIG. 10A. The conditions for etching the near-field transducer shown in FIGS. 10A-B used a hard mask having a thickness of 40 nm. Etching was done using a Veeco NEXUS IBE-420i ion beam etching system (available from Veeco, Plainview, N.Y.), with a beam voltage of 300 V, a beam current of 425 mA, incident RF power of 400 W and suppressor voltage of 850 V. Milling angles varied from 5 degrees to 70 degrees.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. A method of making a plasmonic near-field transducer comprising:
    providing a substrate at least partially covered with a thin layer of a plasmonic material;
    overlaying a first mask having a first shape on the plasmonic material;
    etching the plasmonic material through the first mask to form a first pattern in the plasmonic material;
    overlaying a second mask having a second shape on the first pattern of plasmonic material;
    etching the first pattern of plasmonic material through the second mask to form a flared region that narrows towards an output end of the plasmonic near-field transducer, wherein the plasmonic near-field transducer comprises a peg region that extends from the flared region to the output end; and
    patterning an enlarged region of plasmonic material atop and in contact with the flared region.

2. A method according to claim 1, wherein the near-field transducer comprises an enlarged region at an input end, and a flared region that narrows towards an output end, the flared region in contact with the enlarged region, wherein the plasmonic near-field transducer comprises a peg region that extends from the flared region to the output end, wherein the plasmonic near-field transducer has a break point located on the enlarged region at a point closest to the output end of the flared region.

3. A method according to claim 1, wherein the substrate comprises at least one of silicon, an inorganic dielectric, an organic dielectric, a polymer dielectric, glass, a nonconductive metal, and a ceramic.

4. A method according to claim 1, wherein the plasmonic material is selected from gold, silver, copper, aluminum, and alloys thereof.

5. A method according to claim 4, wherein the plasmonic material comprises gold.

6. A method according to claim 1, wherein the first mask comprises a phase-shift mask and the second mask comprises a binary mask.

7. A method according to claim 1, wherein etching comprises ion etching.

8. A method according to claim 1, wherein the flared region of plasmonic material has a flared angle of from about 15 to about 30 degrees.

9. A method of making a plasmonic near-field transducer comprising:
    providing a planar substrate covered with a thin layer of at least one plasmonic material;
    overlaying the plasmonic material with a hard mask having an enlarged region and a peg region; and
    milling the plasmonic material at an angle, other than normal, to the plane of the substrate surface while rotating the substrate around an axis normal to the plane of the substrate surface, wherein the enlarged portion of the hard mask shadows the milling forming rounded edges of the plasmonic material on the planar substrate.

10. A method according to claim 9, wherein the rounded edges form a flare region.

11. A method according to claim 9, wherein the peg region comprises a flared region and a peg.

12. A method according to claim 11, wherein the substrate comprises at least one of a silicon wafer, an inorganic dielectric, an organic dielectric, a polymer dielectric, glass, a non-conductive metal, and a ceramic.

13. A method according to claim 11, wherein the plasmonic material is selected from gold, silver, copper, aluminum and alloys thereof.

14. A method according to claim 13, wherein the plasmonic material comprises gold.

15. A method according to claim 11, wherein the hard mask comprises amorphous carbon.

16. A method according to claim 11, wherein the milling angle is from 5 to 70 degrees from the axis normal to the plane of the substrate.

17. A method according to claim 11, wherein milling comprises ion etching.

18. A method according to claim 11, further comprising removing the mask.

19. A method according to claim 1, wherein the first shape is an hourglass.

20. A method according to claim 1, wherein the first mask has a first length and the second mask has a second length, the second length being less than the first length.

\* \* \* \* \*